United States Patent [19]
Ouellette

[11] Patent Number: 5,947,647
[45] Date of Patent: Sep. 7, 1999

[54] CONVEYOR COUPLING

[75] Inventor: Joseph F. Ouellette, Glendale, Mo.

[73] Assignee: Ouellette Machinery Systems, Inc., Fenton, Mo.

[21] Appl. No.: 08/792,287

[22] Filed: Jan. 31, 1997

[51] Int. Cl.$^6$ .................................................. B65G 51/02
[52] U.S. Cl. .......................... 406/191; 406/88; 406/196
[58] Field of Search ............................... 406/86, 88, 196, 406/191

[56] References Cited

U.S. PATENT DOCUMENTS 5,567,091 10/1996 Johnson et al. ................... 406/196 X
5,630,679 5/1997 Simkowski et al. ................ 406/196 X Primary Examiner—Andrew C. Pike
Attorney, Agent, or Firm—Howell & Haferkamp, L.C.

[57] ABSTRACT

An air conveyor apparatus is adapted for conveying bottle containers having a neck ring with an outer diameter dimension. The conveyor apparatus includes a first air conveyor section and a second air conveyor section. The first air conveyor section has a first conveying slot extending longitudinally therethrough in a downstream direction. The first conveying slot is defined by a first pair of mutually opposed, laterally spaced, substantially horizontal flanges. The first pair of flanges are laterally spaced by a distance smaller than the outer diameter dimension of the container neck rings so that the containers can be conveyed with the neck rings sliding in a friction engagement along the first pair of flanges as the containers are conveyed through the first air conveyor section. The second air conveyor section has a second conveying slot extending longitudinally therethrough in the downstream direction. The second conveying slot is defined by a second pair of mutually opposed, laterally spaced, substantially horizontal flanges. The second pair of flanges are also spaced by a distance smaller than the outer diameter dimension of the container neck rings so that the containers can be conveyed with the neck rings sliding in a friction engagement along the second pair of flanges as the containers are conveyed through the second air conveyor section. The second air conveyor section is coupled with the first air conveyor section in a manner so that the second conveying slot receives the containers from the first air conveyor section for continued conveyance of the containers in the downstream direction. An upstream end of the second pair of flanges is proximate a downstream end of the first pair of flanges. The first and second air conveyor sections are coupled with one another in a manner so that the downstream end of the first pair of flanges is spaced slightly above the upstream end of the second pair of flanges.

14 Claims, 11 Drawing Sheets

CONVEYOR COUPLING

BACKGROUND OF THE INVENTION

(1) Field of the Invention

The present invention pertains to a pivotable conveyor coupling for pivotally connecting conveyor sections. More particularly the present invention pertains to an air conveyor for conveying bottles, the conveyor having pivotable couplings joining conveyor sections thereby allowing the conveyor sections to be pivoted relative to one another.

(2) Description of the Prior Art

An air conveyor is useful for the rapid transport of plastic bottles between work stations as, for example, between a storage station and a bottle-filling station. Typically, the known air conveyor includes a pair of flanges spaced to define an elongated slot therebetween, and a series of air ducts or air jets on opposite sides of the slot. Plastic bottles are formed with annular rims adjacent the tops of their necks. With the bottle necks extending through the slot and the rims overlying the spaced flanges, the bottles are suspended from the flanges and hang below the slot. Pressurized air from the ducts is directed in streams toward the bottles. The bottles move through the slot as a result of the force of the air streams against the bottles with the rims sliding along the spaced flanges in a frictional engagement.

Some prior art air conveyors have been constructed with means for diverting bottle containers from an input conveyor to a selected one of several output conveyors. Similarly, air conveyors have been constructed with means for joining a selected one of several input conveyors to an output conveyor. However, these prior art air conveyor systems lack means for freely moving different segments of the conveyor relative to one another to selectively change the path of the conveyor.

SUMMARY OF THE INVENTION

It is an object of the present invention to provide an air conveyor for conveying bottles, the air conveyor having conveyor sections that are freely moveable relative to one another so that the conveying path can be easily changed without substantially interrupting the continuity of the conveying path and without compromising the efficiency with which the bottles are conveyed. Another object is to provide an air conveyor with a readily changeable conveying path so that a selected one of several upstream conveyor sections can be removably connected to a selected one of several downstream conveyor sections. Still another object of the present invention is to provide an articulable conveyor apparatus which can be selectively arranged so as to provide changeable curves and turns in the conveying path as desired. These and other objects are accomplished by the present invention which provides an air conveyor apparatus configured for pivotally connecting an upstream air conveyor section and a downstream air conveyor section.

A horizontally pivoting first embodiment of the present invention includes a first pivot housing, a second pivot housing, and an intermediate pivot housing between the first and second pivot housings. The intermediate pivot housing is pivotally connected to the first and second pivot housings with pivot pins. The pivot pins connecting the pivot housings are arranged substantially vertically so that the first and second pivot housings are pivotable relative to one another and relative to the intermediate pivot housing about a pair of vertical pivot axes. The first pivot housing is removably connected to the upstream air conveyor section and the second pivot housing is removably connected to the downstream air conveyor section. Therefore, by pivoting the first pivot housing relative to the second pivot housing, the upstream and downstream air conveyor sections can be pivoted relative to one another in a substantially horizontal plane.

The upstream and downstream air conveyor sections each have a conveying slot extending longitudinally therethrough in the downstream direction for conveying plastic bottle containers. Each of the first, second, and intermediate pivot housings also have a conveying slot similar to the conveying slots of the upstream and downstream air conveyor sections. The conveying slot of the first pivot housing is substantially continuous with the conveying slot of the upstream air conveyor section and is configured to receive the bottle containers from the upstream air conveyor section for continued conveyance of the containers in the downstream direction. An upstream end of the conveying slot of the intermediate pivot housing is substantially in register with a downstream end of the conveying slot of the first pivot housing and is configured to receive the containers from the first pivot housing for continued conveyance of the containers in the downstream direction. The bottle containers are then conveyed from the intermediate pivot housing to the second pivot housing, and from the second pivot housing to the downstream air conveyor section, in like fashion.

The present invention preferably includes a support frame for supporting the weight of the downstream air conveyor section. The support frame includes at least one horizontal guide track arranged generally transversely to the downstream air conveyor section. Rollers are mounted to the downstream air conveyor section with roller pins and are positioned on the downstream air conveyor section for rolling engagement with the guide track. The rollers roll along the guide track as the downstream conveyor section is pivoted in the horizontal plane relative to the upstream conveyor section.

In a horizontally pivoting second embodiment of the present invention, there are no intermediate pivot housings. Instead, the upstream end of the second pivot housing is pivotally connected directly to the downstream end of the first pivot housing. The second pivot housing pivots relative to the first pivot housing about a single vertical pivot axis. Apart from these differences, the second embodiment is similar in all other aspects to the first embodiment described above.

A horizontally pivoting third embodiment of the present invention includes a plurality of intermediate pivot housings arranged in a series extending between the first pivot housing and the second pivot housing. The plurality of intermediate pivot housings are pivotally connected to one another with pivot pins to define a train or "snake" of intermediate pivot housings which freely articulates within a substantially horizontal plane. This freely articulating train provides a continuous but changeable conveying path which can be used to connect a selected one of a plurality of independent upstream conveyor sections with a selected one of a plurality of independent downstream conveyor sections. The third embodiment is similar in all other aspects to the first embodiment described above.

In a vertically pivoting fourth embodiment of the present invention, the first and second pivot housings are pivotally connected to one another with horizontally arranged, coaxial pivot pins. The first pivot housing is removably connected to the upstream air conveyor section and the second pivot housing is removably connected the downstream air conveyor section. Therefore, by pivoting the first pivot housing relative to the second pivot housing, the upstream and downstream air conveyor sections can be pivoted relative to one another in a substantially vertical plane.

A vertically pivoting fifth embodiment of the present invention is similar to the fourth embodiment described above, but includes a plurality of intermediate pivot housings which are pivotally connected to the first and second pivot housings and to one another to define an articulating train or "snake" which freely articulates within a vertical plane. Similar to the third embodiment described above, this freely articulating train provides a continuous but changeable conveying path which can be used to connect a selected one of a plurality of independent upstream conveyor sections with a selected one of a plurality of independent downstream conveyor sections.

While the principal advantages and features of the present invention have been described above, a more complete and thorough understanding and appreciation for the invention may be attained by referring to the drawings and descriptions of the preferred embodiments which follow.

DETAILED DESCRIPTION OF THE PREFERRED EMBODIMENT

Figure 1:
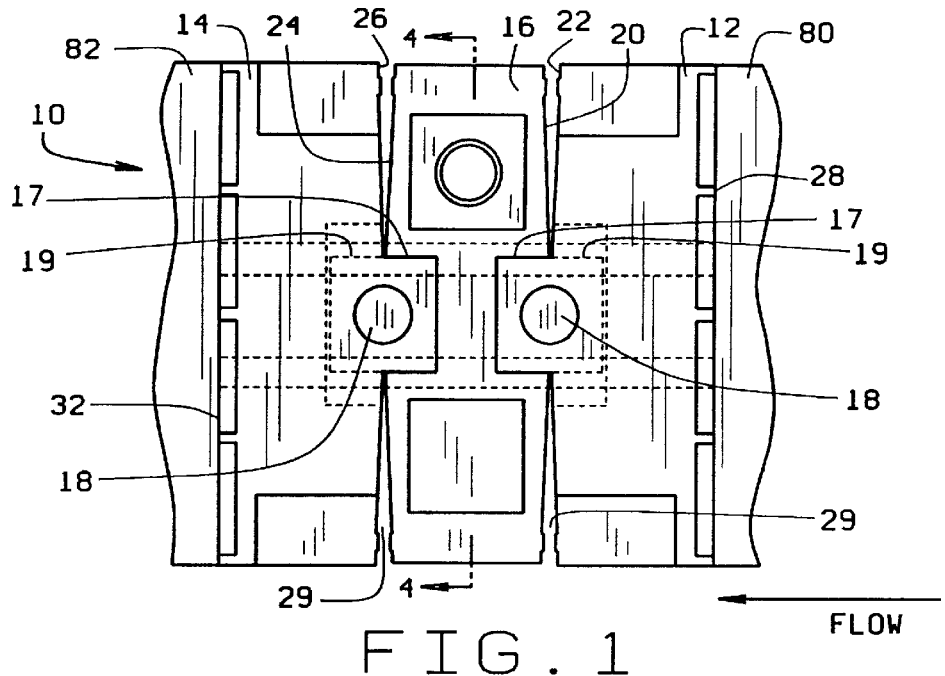
FIG. 1 is a top plan view of a horizontally pivoting first embodiment of the pivoting conveyor coupling of the present invention.

A first embodiment of the pivoting conveyor coupling of the present invention is shown generally as 10 in FIGS. 1 through 8. The pivoting conveyor coupling includes a first pivot housing 12, a second pivot housing 14, and an intermediate pivot housing 16 between the first and second pivot housings 12, 14. The intermediate pivot housing 16 is pivotally connected to the first and second pivot housings 12, 14 with pivot pins 18 for pivoting movement relative thereto. Specifically, an upstream end 20 of the intermediate pivot housing 16 is pivotally connected to a downstream end 22 of the first pivot housing 12, and a downstream end 24 of the intermediate pivot housing 16 is pivotally connected to an upstream end 26 of the second pivot housing 14. The pivot pins 18 connecting the pivot housings 12, 14, 16 are arranged substantially vertically so that the pivot housings 12, 14, 16 are pivotable relative to one another about vertical pivot axes.

Preferably, the pivot housings 12, 14, 16 are machined from solid blocks of cast aluminum. However, the pivot housings could be constructed from other materials and by different processes without departing from the scope of the present invention.

Figure 2:
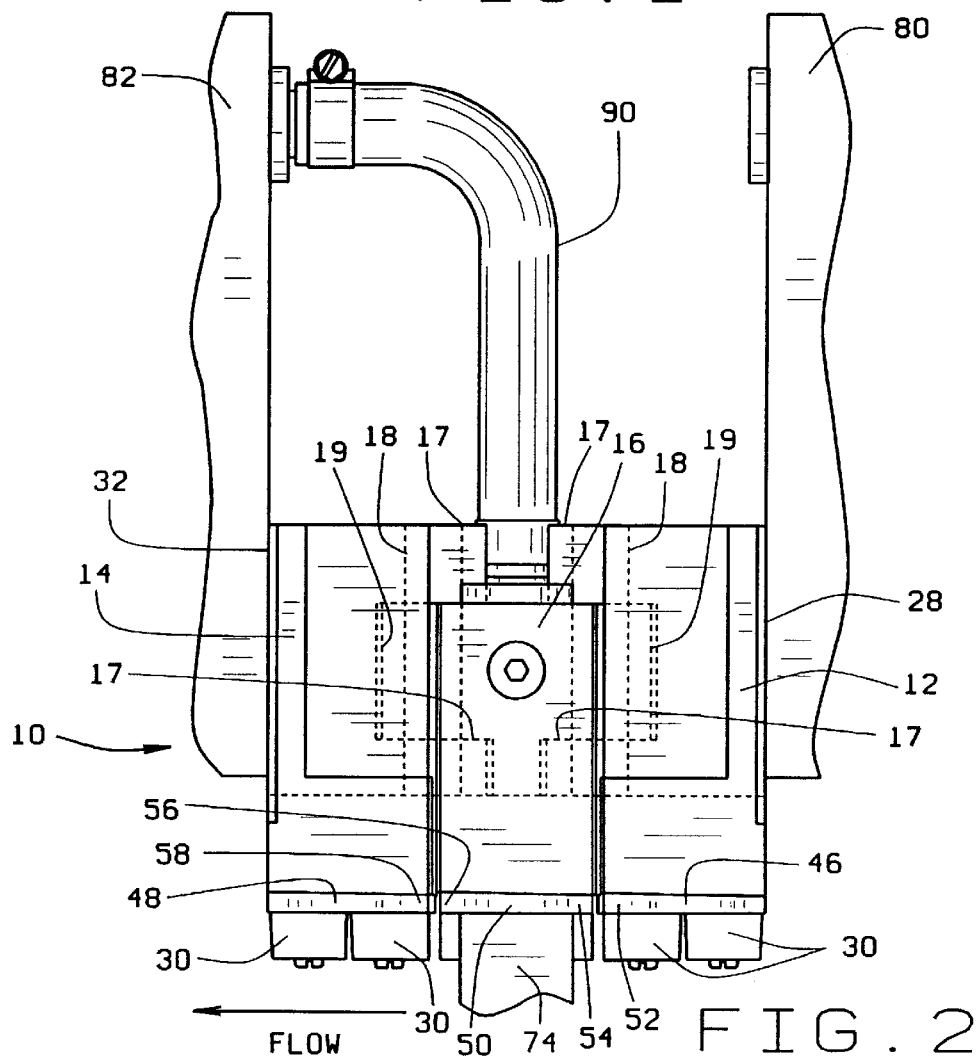
FIG. 2 is a side elevational view of the first embodiment of the pivoting conveyor coupling.

As shown in FIGS. 1 and 2, the first pivot housing 12 is a clevis having two vertically spaced forks 17, and the intermediate pivot housing 16 includes a pivot knuckle 19 configured to be received between the forks 17 of the first pivot housing 12. The pivot pin 18 passes through the two forks 17 of the first pivot housing 12 and the pivot knuckle 19 of the intermediate pivot housing 16 so that the first pivot housing 12 and the intermediate pivot housing 16 can be pivoted relative to one another about the pivot pin 18. The second pivot housing 14 is also a clevis and is pivotally connected to the intermediate pivot housing 16 in the same manner as the first pivot housing 12 described above.

Figure 5:
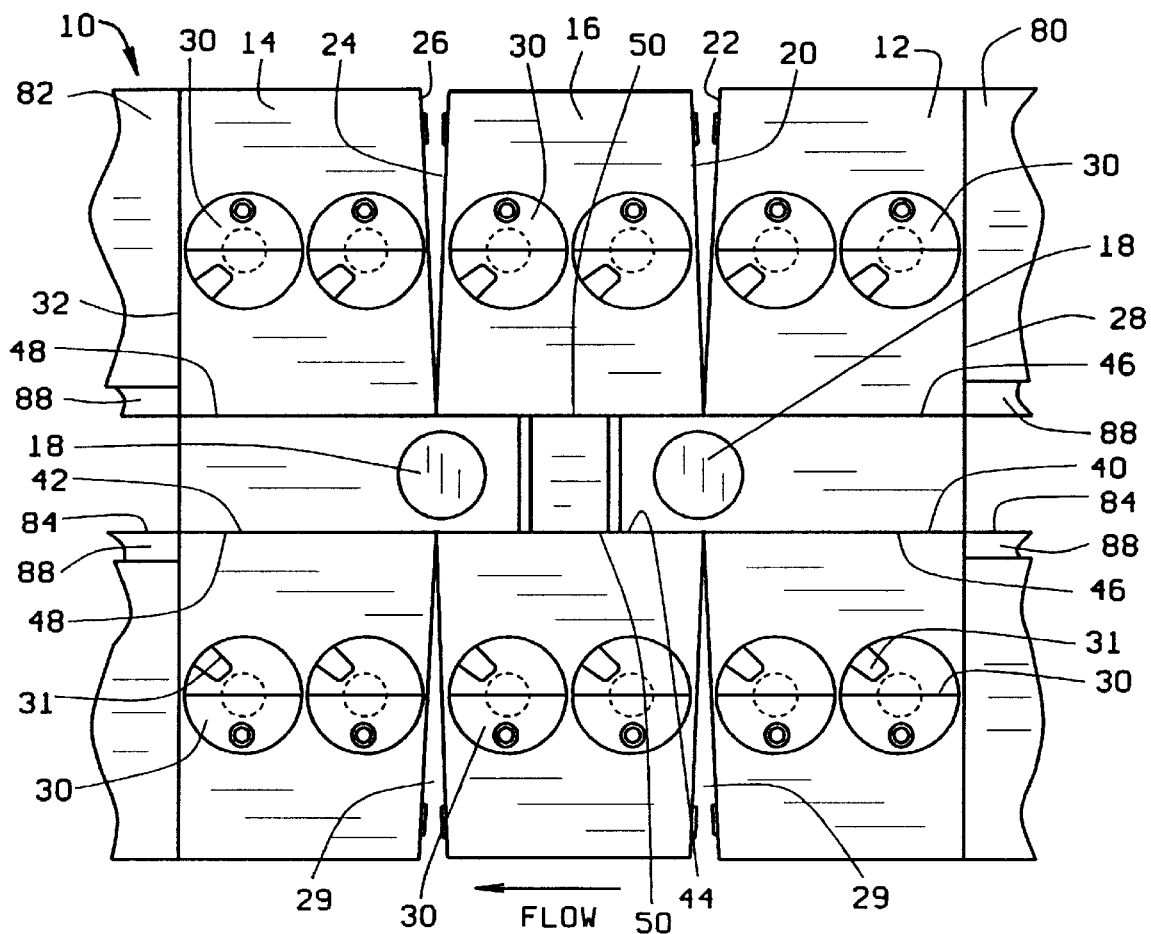
FIG. 5 is a bottom view of the first embodiment of the pivoting conveyor coupling.

As shown in FIGS. 1 and 5, the downstream end 22 of the first pivot housing 12, the upstream end 20 of the intermediate pivot housing 16, the downstream end 24 of the intermediate pivot housing 16, and the upstream end 26 of the second pivot housing 14 are tapered to define gaps 29 between the pivot housings 12, 14, 16. The purpose of the gaps 29 is to accommodate pivoting movement of the pivot housings 12, 14, 16 relative to one another.

Figure 6:
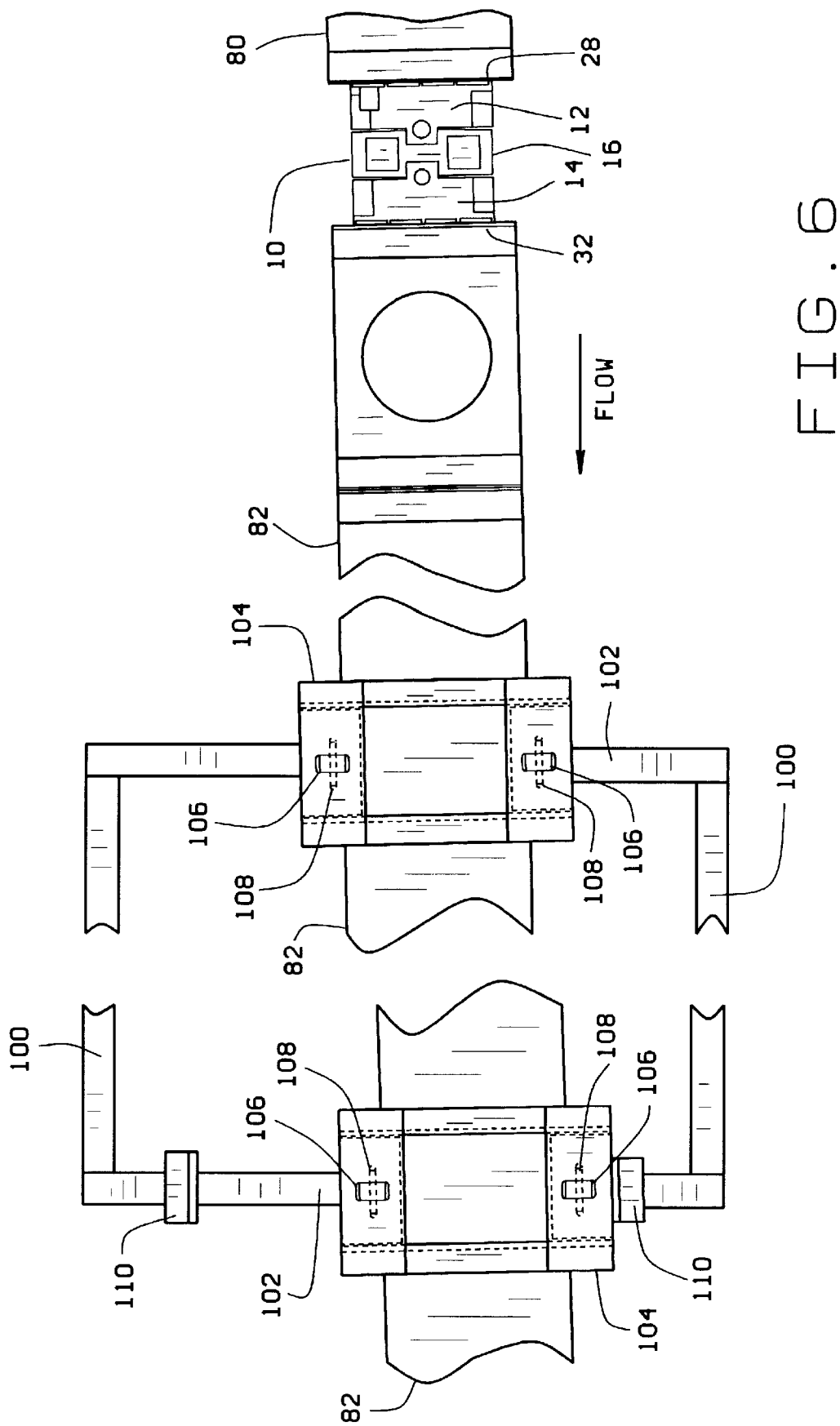
FIG. 6 is a top plan view of the first embodiment of the pivoting conveyor coupling shown with the support structure and guide tracks.
Figure 7:
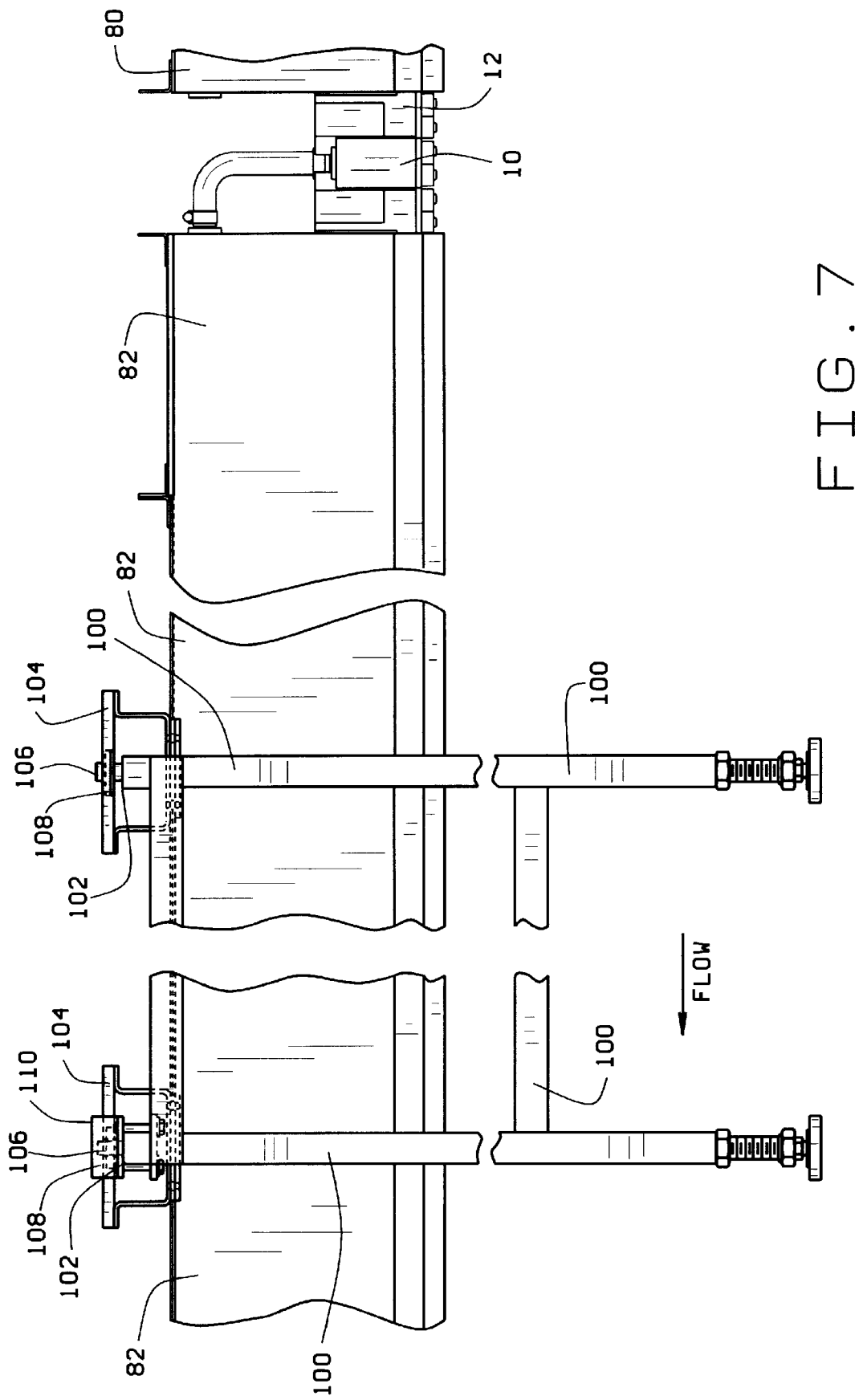
FIG. 7 is a side elevational view of the first embodiment of the pivoting conveyor coupling shown with the support structure and guide tracks.

An upstream end 28 of the first pivot housing 12 is removably connected to an upstream air conveyor section 80 (shown in FIGS. 6 and 7) and a downstream end 32 of the second pivot housing 14 is removably connected to the downstream air conveyor section 82 (shown in FIGS. 6 and 7). Therefore, by pivoting the first pivot housing 12 relative to the second pivot housing 14, the upstream and downstream air conveyor sections 80, 82 can be pivoted relative to one another in a substantially horizontal plane.

The upstream and downstream air conveyor sections with which the pivoting conveyor coupling 10 of the invention is used are known in the art and will only be generally described here. A more detailed description of a state-of-the-art air conveyor for conveying bottle containers is set forth in U.S. Pat. No. 5,611,647, issued Mar. 7, 1997 and incorporated herein by reference.

Figure 4:
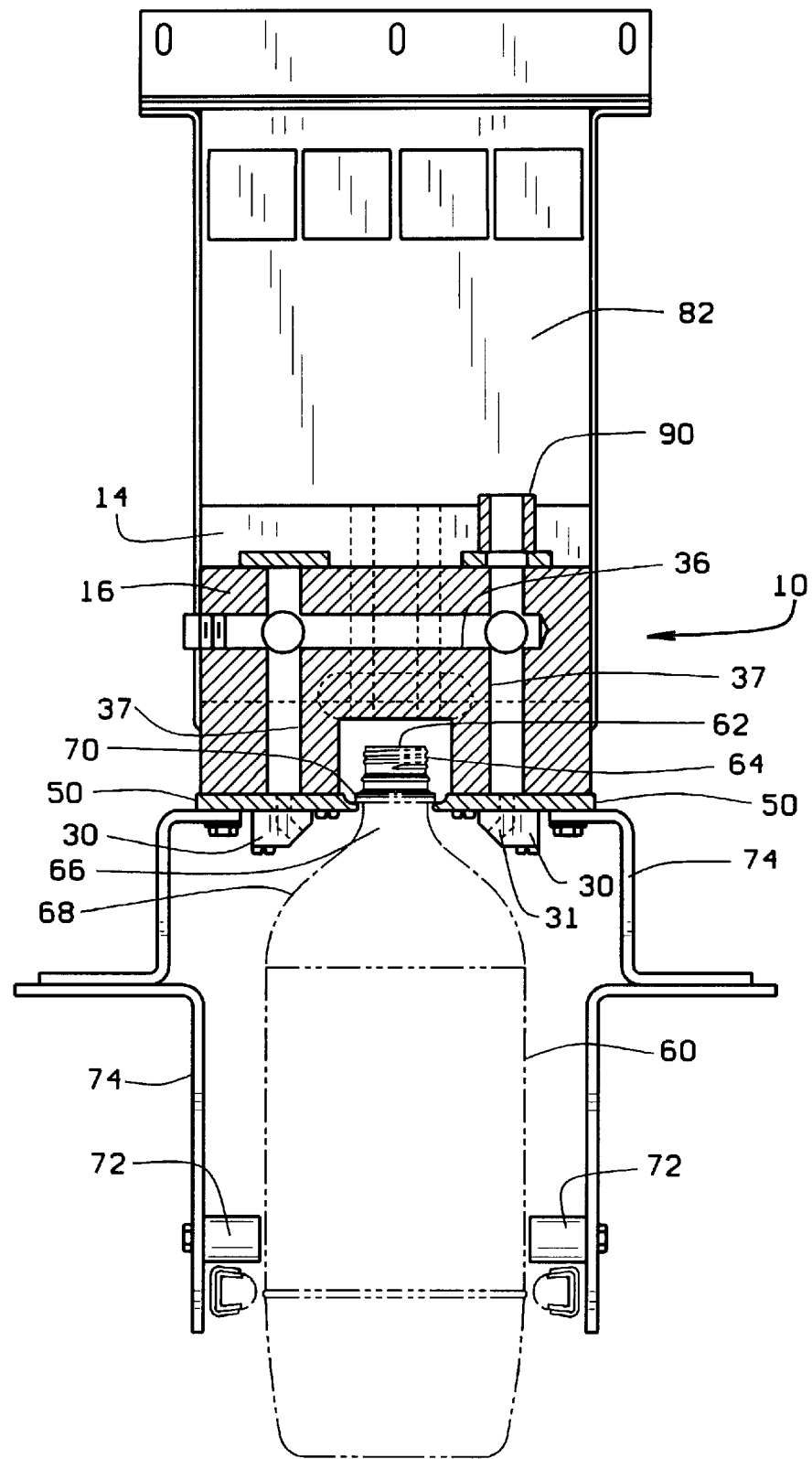
FIG. 4 is an end view, in section taken at line 4—4 of FIG. 1, of the first embodiment of the pivoting conveyor coupling, shown with a bottle container being conveyed.

The upstream and downstream air conveyor sections 80, 82 each have a conveying slot 84 (shown in FIG. 8) extending longitudinally therethrough in the downstream direction for conveying plastic bottle containers 60 (shown in FIG. 4). The bottle containers conveyed by the apparatus of the present invention are generally of the conventional type of plastic bottle used as a container for carbonated beverages and other types of beverages. The bottle containers 60 have an upper throat opening 62 that is usually threaded on its exterior 64 for receiving a cap (not shown).

As the bottle extends downwardly from the throat opening 62, it tapers outwardly along a neck 66 to an annular shoulder 68 of the bottle container 60. An outwardly projecting annular rim or neck ring 70 surrounds the bottle container 60 separating the throat 62 from the tapered neck 66. Plastic bottles of this type are provided in a variety of sizes and configurations.

Figure 8:
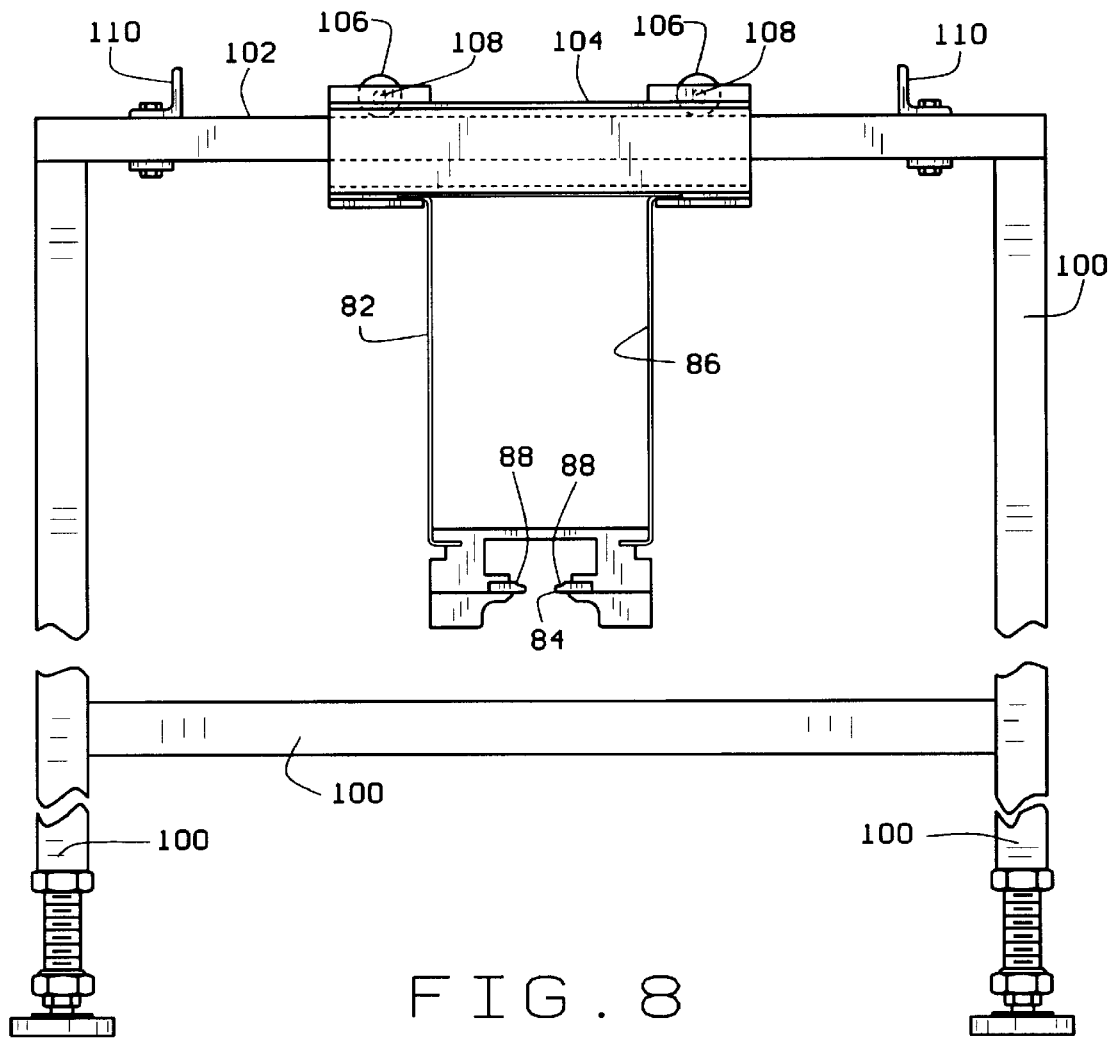
FIG. 8 is an end view of the first embodiment of the pivoting conveyor coupling shown with the support structure and guide tracks.

As shown in FIG. 8, each conveying slot 84 is defined by a pair of laterally spaced, substantially horizontal flanges 88. The flanges 88 are laterally spaced by a distance smaller than an outer diameter dimension of the neck rings 70 of the bottle containers 60. Therefore, with the bottle necks 66 extending through the slot 84 and the neck rings 70 overlying the spaced flanges 88, the bottle containers 60 are suspended from the flanges 88 and hang below the slot 84. A series of air jets (not shown) pass through the parts of the conveyor supporting the pair of flanges 88 shown in FIG. 8 and emerge through exit ports that are arranged along opposite sides of the conveying slot 84. The air jets are fed with pressurized air from an air plenum 86 positioned above the conveying slot 84. Pressurized air from the air jets is directed in streams toward the bottle containers 60. The bottle containers 60 move along the slot 84 in a downstream direction as a result of the force of the air streams against the bottle containers 60 with the neck rings 70 sliding along the spaced flanges 88 in a frictional engagement.

Referring to FIGS. 2–5, the first, second, and intermediate pivot housings 12, 14, 16 each have a conveying slot 40, 42, 44 similar to the conveying slots 84 of the upstream and downstream air conveyor sections 80, 82. The conveying slots 40, 42, 44 of the first, second, and intermediate pivot housings 12, 14, 16 are defined by pairs of laterally spaced flanges 46, 48, 50, respectively.

As shown in FIGS. 5–7, the first pivot housing 12 may be removably connected to the upstream air conveyor section 80. The connections are made by threaded fasteners or any other equivalent methods. When connected, the conveying slot 40 of the first pivot housing 12 is substantially collinear with the conveying slot 84 of the upstream air conveyor section 80 and is configured for receiving the bottle containers 60 from the upstream air conveyor section 80 for continued conveyance of the bottle containers 60 in the downstream direction. The upstream end of the conveying slot 44 of the intermediate pivot housing 16 is substantially in register with the downstream end of the conveying slot 40 of the first pivot housing 12 and is configured to receive the bottle containers 60 from the first pivot housing 12 for continued conveyance of the containers 60 in the downstream direction. Similarly, the upstream end of the conveying slot 42 of the second pivot housing 14 is substantially in register with the downstream end of the conveying slot 44 of the intermediate pivot housing 16 and is configured for receiving the bottle containers 60 from the intermediate pivot housing 16 for continued conveyance. The second pivot housing 14 may be removably connected to the downstream air conveyor section 82. When connected, the conveying slot 84 of the downstream air conveyor section 82 is substantially collinear with the conveying slot 42 of the second pivot housing 14 and is configured for receiving the bottle containers 60 from the second pivot housing 14 for continued conveyance of the bottle containers 60 in the downstream direction.

Figure 3:
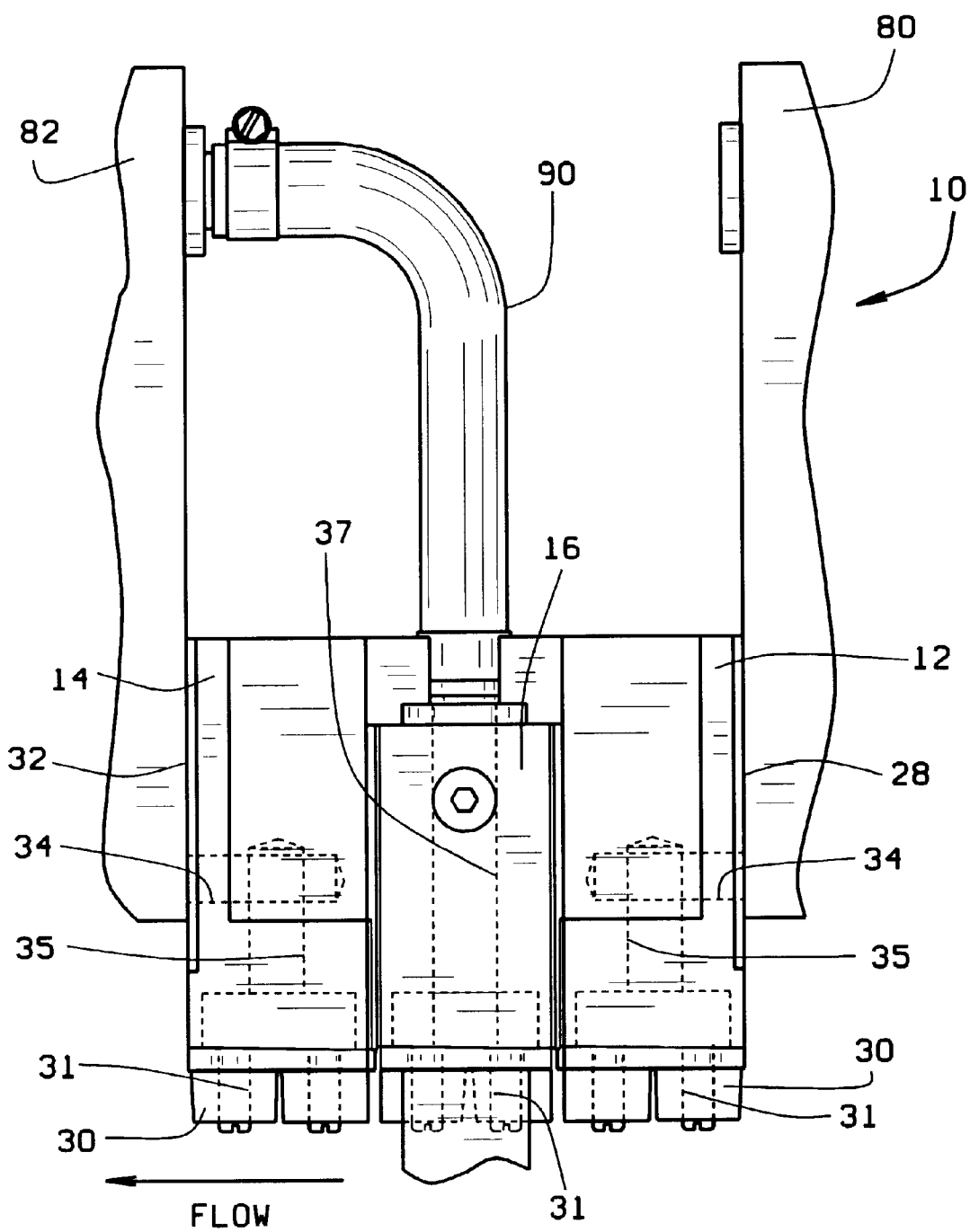
FIG. 3 is a side elevational view showing the air conduits in phantom.

Similar to the upstream and downstream air conveyor sections 80, 82, a series of air jet nozzles 30 extends along opposite sides of the conveying slots 40, 42, 44 of the first, second, and intermediate pivot housings 12, 14, 16. As shown in FIG. 3, the air jet nozzles 30 of the first and second pivot housings 12, 14 are fed with pressurized air from the air plenum 86. Horizontal bores 34 and vertical bores 35 in the first and second pivot housings 12, 14 define air conduits which permit fluid communication between the air plenum 86 and the air jet nozzles 30 of the first and second pivot housings 12, 14. As shown in FIG. 5, the air jet nozzles 30 include jet port openings 31 which are aimed to eject streams of air toward the bottle containers 60 to move the containers 60 in the downstream direction. Pressurized air from one of the air plenums 86 is fed to air jet nozzles 30 of the intermediate pivot housing 16 via plenum hose 90. As shown in FIGS. 3 and 4, a horizontal bore 36 and two vertical bores 37 in the intermediate pivot housing 16 define air conduits which permit fluid communication between the plenum hose 90 and the air jet nozzles 30 of the intermediate pivot housing 16.

The present invention preferably includes a support frame 100 (See FIGS. 6–8) for supporting the weight of the downstream air conveyor section 82. The support frame 100 includes horizontal guide tracks 102 arranged generally transversely to the downstream air conveyor section 82. Rollers 106 are mounted to roller plates 104 with roller pins 108. The roller plates 104 are, in turn, mounted to the downstream air conveyor section 82 with the rollers 106 positioned for rolling engagement with the guide tracks 102. The rollers 106 roll along the guide tracks 102 as the downstream conveyor section 82 is pivoted in the horizontal plane relative to the upstream conveyor section 80. At least one of the guide tracks 102 includes a pair of laterally spaced stops 110 for restricting movement of the rollers 106 along the guide track 102 to an area between the stops 110, thereby limiting the range of horizontal movement of the downstream conveyor section 82 relative to the support frame 100. Although rollers 106 are used in the preferred embodiment, it should be understood that the support frame 100 could be configured for sliding engagement, or other engagement, of the downstream conveyor section 82 and guide tracks 102 without departing from the scope of the invention.

Preferably, the flanges 46, 48, 50 of the first, second, and intermediate pivot housings 12, 14, 16 have a slightly inclined orientation as they extend in the downstream direction. As shown in FIG. 2, the downstream end 52 of the flanges 46 of the first pivot housing 12 is slightly above the level of the upstream end 54 of the flanges 50 of the intermediate pivot housing 16. Similarly, the upstream end 58 of the flanges 48 of the second pivot housing 14 is slightly below the level of the downstream end 56 of the flanges 50 of the intermediate pivot housing 16. In other words, the upstream ends of the flanges 46, 48, and 50 are in a first generally horizontal plane and the downstream ends of the flanges 46, 48, and 50 are in a second generally horizontal plane that is spaced slightly above the first generally horizontal plane. Therefore, the flanges 46, 48, 50 are in a "down-stepping" relationship as the conveyor extends in the downstream direction. This down-stepping relationship helps to avoid jamming of the bottle containers 60 at the interfaces of the pivot housings 12, 14, 16 as the bottle containers 60 are conveyed in the downstream direction.

As shown in FIG. 4, bottle guides 72 are provided for guiding the bottles along the conveying path. The bottle guides 72 are suspended from the flanges 50 by guide brackets 74.

Figure 9:
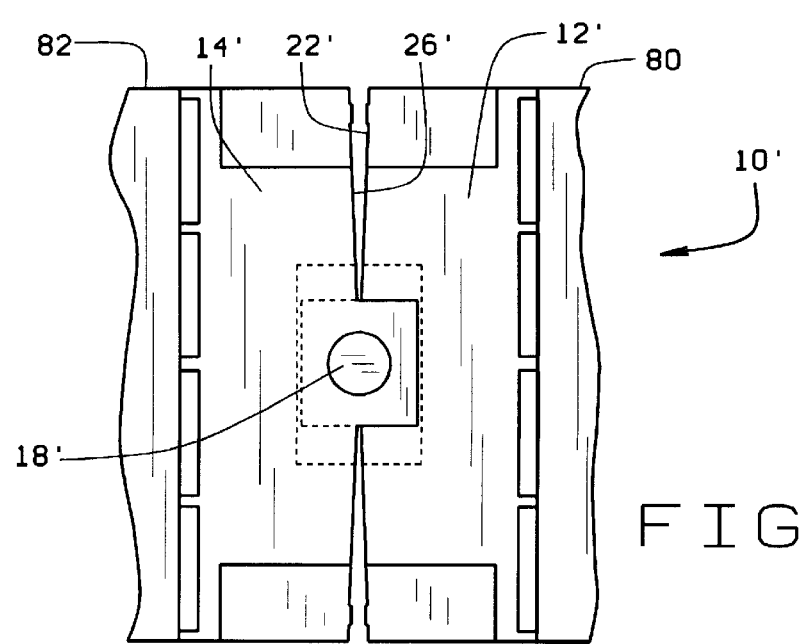
FIG. 9 is a top plan view of a horizontally pivoting second embodiment of the pivoting conveyor coupling.

A second embodiment of the present invention is shown generally as 10' in FIG. 9. This second embodiment includes no intermediate pivot housings. Instead, the upstream end 26' of the second pivot housing 14' is pivotally connected directly to the downstream end 22' of the first pivot housing 12', with the downstream end 22' of the first pivot housing 12' having the construction of the downstream end 24 of the intermediate pivot housing 16 of the previous embodiment. The second pivot housing 14' pivots relative to the first pivot housing 12' about a single vertical pivot pin 18'. Apart from these differences, this second embodiment is similar in all other aspects to the first embodiment described above.

Figure 10:
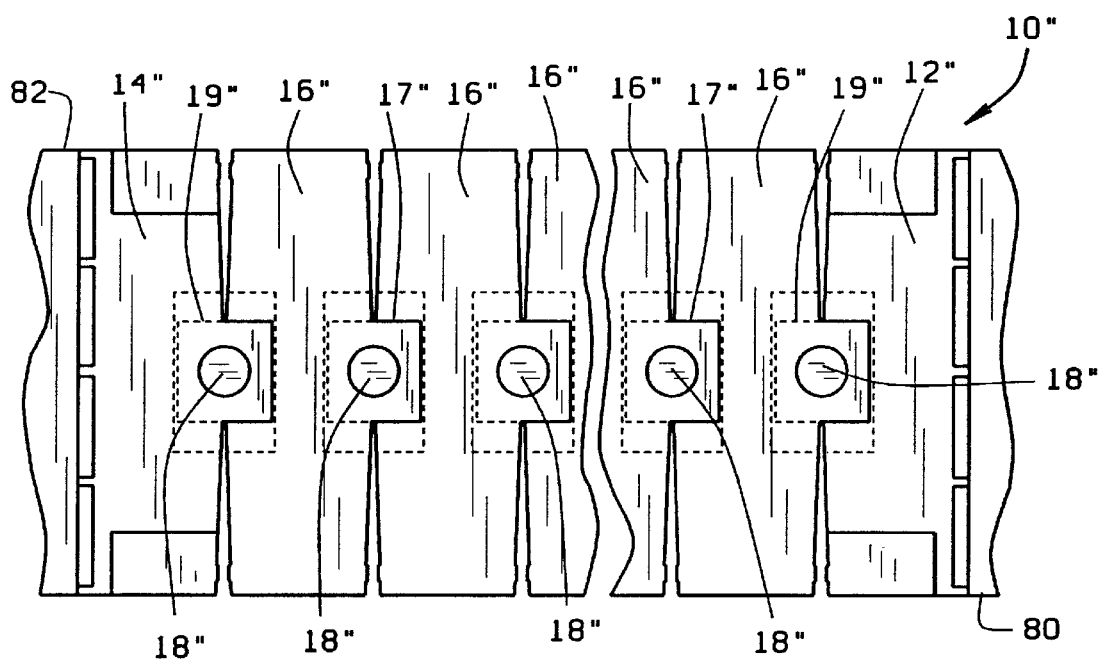
FIG. 10 is a top plan view of a horizontally pivoting third embodiment of the pivoting conveyor coupling.
Figure 11:
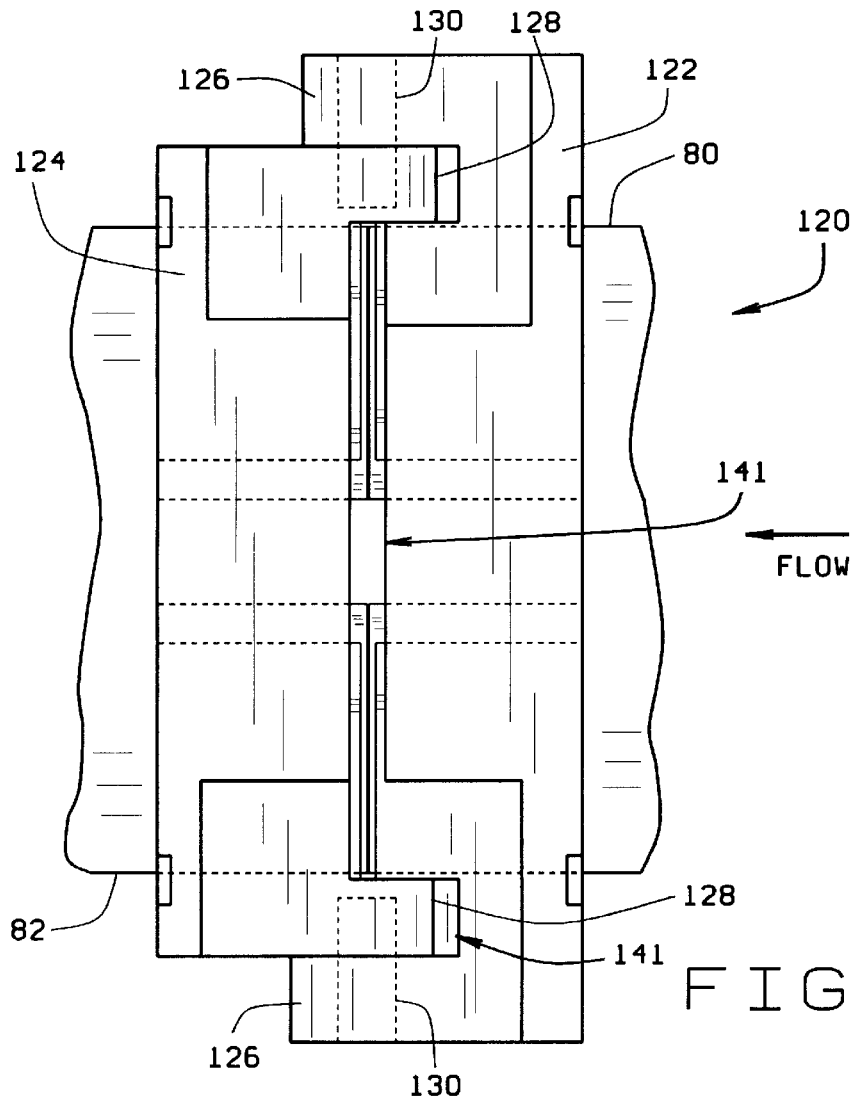
FIG. 11 is a top plan view of a vertically pivoting fourth embodiment of the pivoting conveyor coupling.
Figure 12:
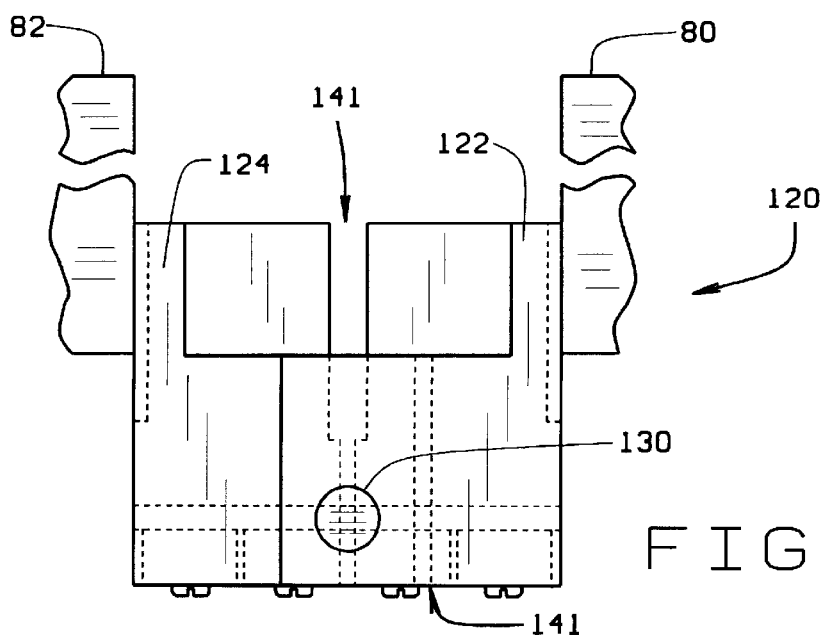
FIG. 12 is a side elevational view of the fourth embodiment of the pivoting conveyor coupling.

A third embodiment of the present invention is shown generally as 10" in FIG. 10. The third embodiment includes a plurality of intermediate pivot housings 16" arranged in a series extending between the first pivot housing 12" and the second pivot housing 14". Each of the intermediate housings is constructed with a pivot knuckle 19" at its left side and a pair of vertically spaced forks 17" at its right side. The pair of forks 17" of each intermediate housing receive a pivot knuckle 19" of an adjacent intermediate housing. The plurality of intermediate pivot housings 16" are pivotally connected to one another with pivot pins 18" to define a train or "snake" of intermediate pivot housings 16" which freely articulates within a substantially horizontal plane. This freely articulating train provides a continuous but changeable conveying path which can be used to connect a selected one of a plurality of independent upstream conveyor sections 80 with a selected one of a plurality of independent downstream conveyor sections 82. The air jet nozzles (not shown) of each intermediate pivot housing are supplied with a flow of air by a hose connection (not shown) to either the upstream or downstream plenum, just as in the first embodiment. The third embodiment is similar in all other aspects to the first embodiment described above.

A vertically pivoting fourth embodiment of the present invention is shown generally as 120 in FIGS. 11 through 14. A first pivot housing 122 and a second pivot housing 124 are pivotally connected to one another with coaxial pivot pins 130. There are no intermediate pivot housings. The pivot pins 130 connecting the first and second pivot housings 122, 124 are arranged substantially horizontally so that the first and second pivot housings 122, 124 are pivotable relative to one another about a horizontal pivot axis. The first pivot housing 122 is removably connected to the upstream air conveyor section 80 and the second pivot housing 124 is removably connected the downstream air conveyor section 82. Therefore, by pivoting the first pivot housing 122 relative to the second pivot housing 124, the upstream and downstream air conveyor sections 80, 82 can be pivoted relative to one another in a substantially vertical plane.

Preferably, one of the first and second pivot housings is a clevis having two forks and the other pivot housing is positioned between the two forks of the clevis. In FIGS. 11 through 14, the first pivot housing 122 is a clevis having two forks 126 and the second pivot housing 124 includes pivot knuckles 128 positioned between the forks 126 of the clevis. The coaxial pivot pins 130 extend toward each other from the forks 126 and engage in holes in the pivot knuckles 128, thereby connecting the first and second pivot housings 122, 124 for pivoting movement relative to one another.

The first and second pivot housings 122, 124 each have a conveying slot 132, 134 similar to the conveying slots 40, 42, 44 of the first, second, and intermediate pivot housings of the first embodiment discussed above. As with the first embodiment, the conveying slots 132, 134 of the first and second pivot housings 122, 124 are defined by pairs of laterally spaced flanges 136, 138 respectively. Also similar to the first embodiment, a series of air jet nozzles 140 extends along opposite sides of the conveying slots 132, 134 of the first and second pivot housings 122, 124. These air jet nozzles 140 are supplied with a flow of air from the air plenums of the upstream 80 and downstream 82 conveyors in the same manner as the first described embodiment. The vertical gaps 141 between the first and second housings limit the extent of their relative pivoting movement.

Figure 13:
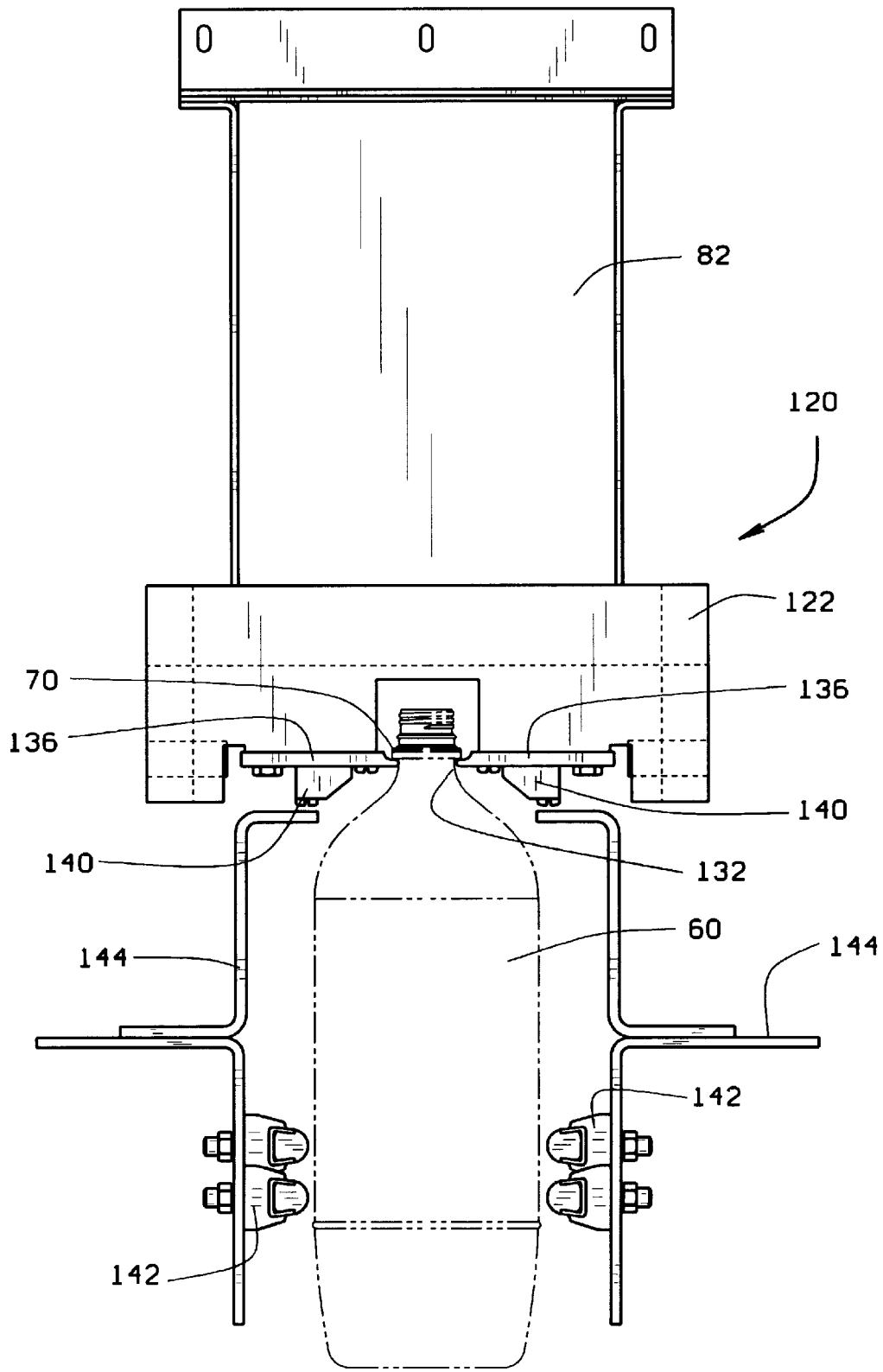
FIG. 13 is an end view of the fourth embodiment of the pivoting conveyor coupling shown with a bottle container being conveyed.
Figure 14:
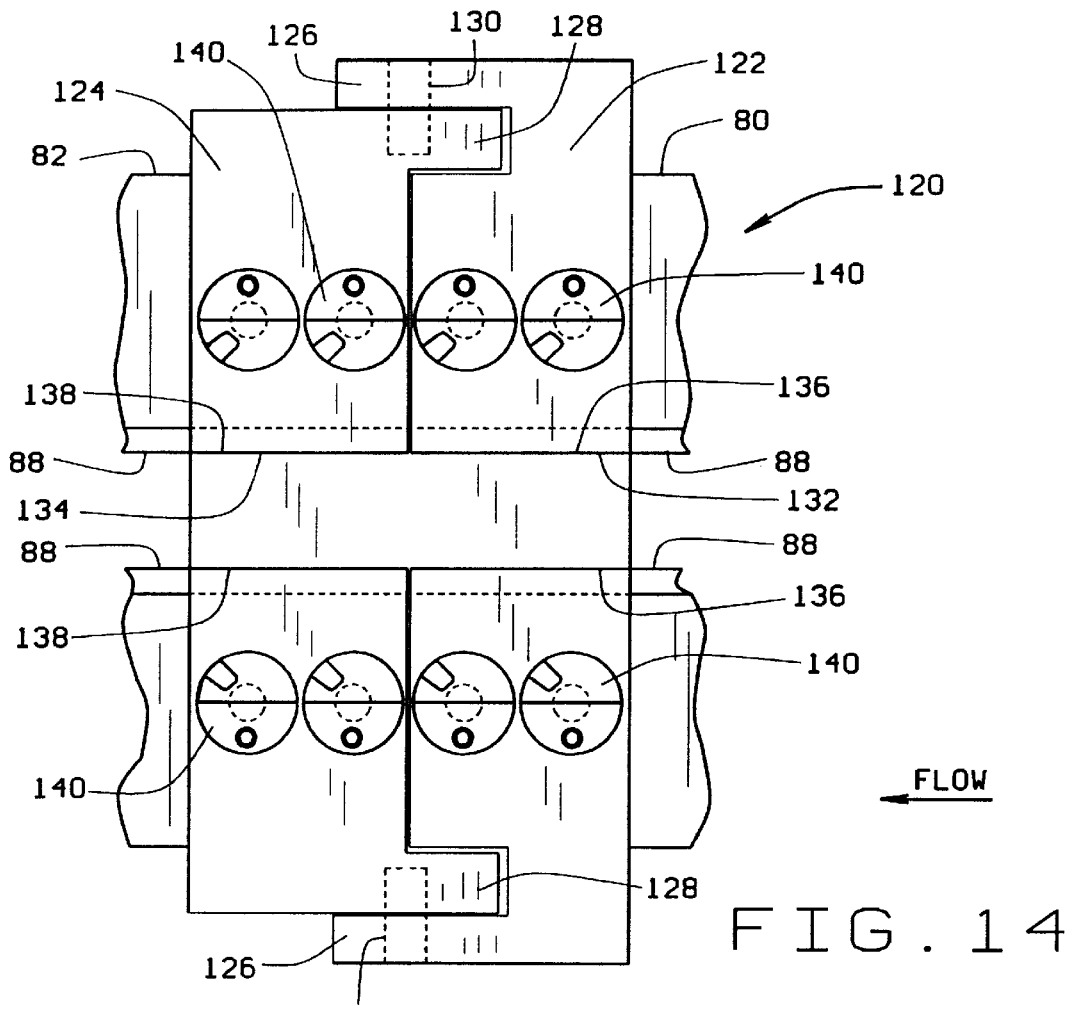
FIG. 14 is a bottom view of the fourth embodiment of the pivoting conveyor coupling.

As shown in FIG. 13, bottle guides 142 are provided for guiding the bottle containers 60 along the conveying path. The bottle guides 142 are suspended on opposite sides of the bottle containers 60 by guide brackets 144.

Figure 15:
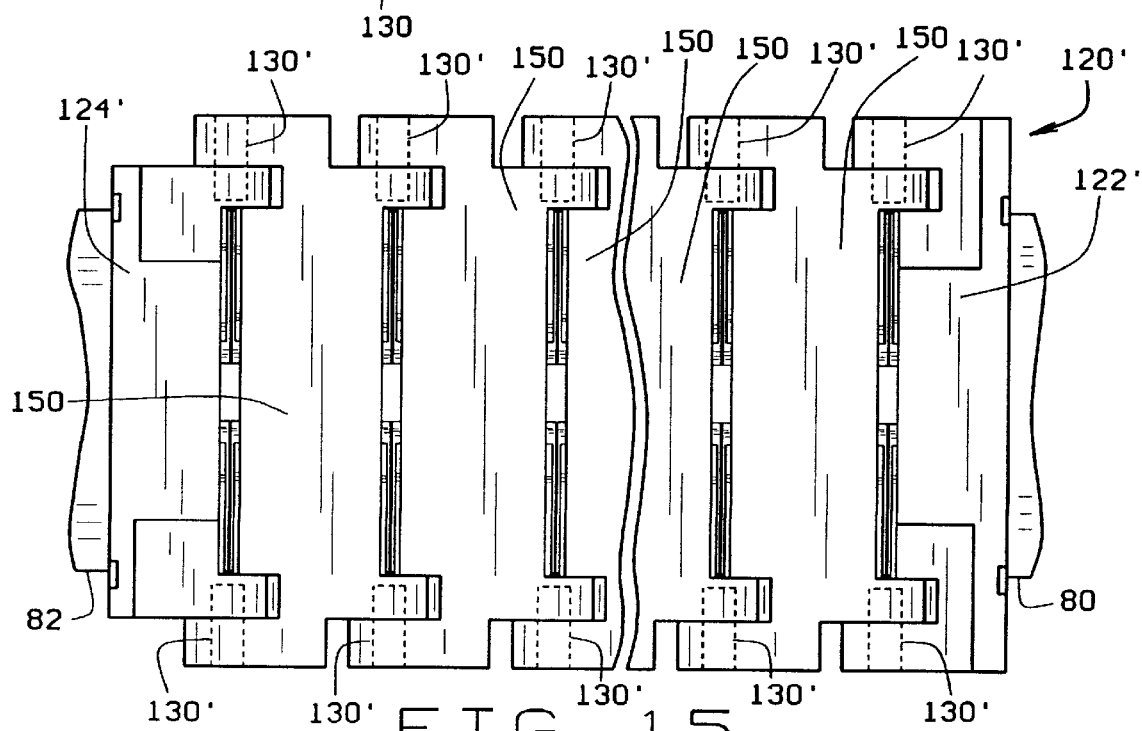
FIG. 15 is a top plan view of a vertically pivoting fifth embodiment of the pivoting air conveyor coupling.

A fifth embodiment of the present invention is shown generally as 120' in FIG. 15. The fifth embodiment is similar to the fourth embodiment described above, but includes a plurality of intermediate pivot housings 150 arranged in a series extending between the first and second pivot housings 122', 124'. The intermediate pivot housings 150 are pivotally connected to the first and second pivot housings 122', 124' and to one another to define an articulating train or "snake" of intermediate pivot housings. The air jet nozzles (not shown) of each intermediate pivot housing are supplied with a flow of air by a hose connection (not shown) to either the upstream or downstream plenum, just as in the first embodiment. As in the fourth embodiment, the pivot pins 130' connecting each pivot housing 122', 124', 150 are arranged substantially horizontally so that the pivot housings 122', 124', 150 are pivotable relative to one another about substantially horizontal pivot axes. Therefore, the apparatus articulates within a vertical plane. Similar to the third embodiment described above, this articulating train provides a continuous but changeable conveying path which can be used to connect a selected one of a plurality of independent upstream conveyor sections 80 with a selected one of a plurality of independent downstream conveyor sections 82. Additionally, by articulating within a vertical plane, the height of the apparatus can be selectively altered in order to accommodate different sized bottles.

While the present invention has been described by reference to a specific embodiment, and a particular use, it should be understood that modifications and variations of the invention may be constructed, and different uses of the invention may be made, without departing from the scope of the invention in the following claims.

What is claimed is:

1. A conveyor apparatus for conveying bottle containers having a neck ring with an outer diameter dimension, the conveyor apparatus comprising:

a first air conveyor section extending generally in a downstream direction, the first air conveyor section having a first conveying slot extending longitudinally therethrough in the downstream direction, the first conveying slot being defined by a first pair of mutually opposed, laterally spaced, substantially horizontal flanges, the first pair of flanges being laterally spaced by a distance smaller than the outer diameter dimension of the container neck rings so that the containers can be conveyed with the neck rings sliding in a friction engagement along the first pair of flanges as the containers are conveyed through the first air conveyor section, the first pair of flanges having an upstream end and a downstream end; and a second air conveyor section extending generally in the downstream direction, the second air conveyor section having a second conveying slot extending longitudinally therethrough in the downstream direction, the second conveying slot being defined by a second pair of mutually opposed, laterally spaced, substantially horizontal flanges, the second pair of flanges being laterally spaced by a distance smaller than the outer diameter dimension of the container neck rings so that the containers can be conveyed with the neck rings sliding in a friction engagement along the second pair of flanges as the containers are conveyed through the second air conveyor section, the second air conveyor section being coupled with the first air conveyor section in a manner so that the second conveying slot is adapted to receive the containers from the first air conveyor section for continued conveyance of the containers in the downstream direction, the second pair of flanges having an upstream end and a downstream end, the upstream end of the second pair of flanges being proximate the downstream end of the first pair of flanges;

the second air conveyor section being coupled with the first air conveyor section in a manner so that the downstream end of the first pair of flanges is slightly above the upstream end of the second pair of flanges.

2. The conveyor apparatus of claim 1 wherein the first pair of flanges inclines slightly as it extends from the upstream end thereof to the downstream end thereof.

3. The conveyor apparatus of claim 2 wherein the second pair of flanges inclines slightly as it extends from the upstream end thereof to the downstream end thereof.

4. The conveyor apparatus of claim 3 further comprising a third air conveyor section extending generally in the downstream direction, the third air conveyor section having a third conveying slot extending longitudinally therethrough in the downstream direction, the third conveying slot being defined by a third pair of mutually opposed, laterally spaced, substantially horizontal flanges, the third pair of flanges being laterally spaced by a distance smaller than the outer diameter dimension of the container neck rings so that the containers can be conveyed with the neck rings sliding in a friction engagement along the third pair of flanges as the containers are conveyed through the third air conveyor section, the third air conveyor section being coupled with the second air conveyor section in a manner so that the third conveying slot is adapted to receive the containers from the second air conveyor section for continued conveyance of the containers in the downstream direction, the third pair of flanges having an upstream end and a downstream end, the upstream end of the third pair of flanges being proximate the downstream end of the second pair of flanges;

the third air conveyor section being coupled with the second air conveyor section in a manner so that the downstream end of the second pair of flanges is slightly above the upstream end of the third pair of flanges.

5. The conveyor apparatus of claim 4 wherein the third pair of flanges inclines slightly as it extends from the upstream end thereof to the downstream end thereof.

6. The conveyor apparatus of claim 5 wherein the upstream ends of the first, second, and third pairs of flanges all lie in a first generally horizontal plane.

7. The conveyor apparatus of claim 6 wherein the downstream ends of the first, second, and third pairs of flanges all lie in a second generally horizontal plane, the second plane being spaced slightly above the first plane.

8. A conveyor apparatus for conveying bottle containers having a neck ring with an outer diameter dimension, the conveyor apparatus comprising:

a first air conveyor section extending generally in a downstream direction, the first air conveyor section having a first conveying slot extending longitudinally therethrough in the downstream direction, the first conveying slot being defined by a first pair of mutually opposed, laterally spaced, substantially horizontal flanges, the first pair of flanges being laterally spaced by a distance smaller than the outer diameter dimension of the container neck rings so that the containers can be conveyed with the neck rings sliding in a friction engagement along the first pair of flanges as the containers are conveyed through the first air conveyor section, the first pair of flanges having an upstream end and a downstream end; and a second air conveyor section extending generally in the downstream direction, the second air conveyor section having a second conveying slot extending longitudinally therethrough in the downstream direction, the second conveying slot being defined by a second pair of mutually opposed, laterally spaced, substantially horizontal flanges, the second pair of flanges being laterally spaced by a distance smaller than the outer diameter dimension of the container neck rings so that the containers can be conveyed with the neck rings sliding in a friction engagement along the second pair of flanges as the containers are conveyed through the second air conveyor section, the second air conveyor section being coupled with the first air conveyor section in a manner so that the second conveying slot is adapted to receive the containers from the first air conveyor section for continued conveyance of the containers in the downstream direction, the second pair of flanges having an upstream end and a downstream end, the upstream end of the second pair of flanges being proximate the downstream end of the first pair of flanges;

the upstream ends of the first and second pairs of flanges all lying in a first generally horizontal plane, the downstream ends of the first and second pairs of flanges all lying in a second generally horizontal plane, the second plane being spaced slightly above the first plane.

9. The conveyor apparatus of claim 8 where each of the first and second pairs of flanges incline slightly as they extend in the downstream direction so that a transition from the first pair of flanges to the second pair of flanges is in a down-stepping relationship as the apparatus extends in the downstream direction.

10. The conveyor apparatus of claim 8 further comprising a third air conveyor section extending generally in the downstream direction, the third air conveyor section having a third conveying slot extending longitudinally therethrough in the downstream direction, the third conveying slot being defined by a third pair of mutually opposed, laterally spaced, substantially horizontal flanges, the third pair of flanges being laterally spaced by a distance smaller than the outer diameter dimension of the container neck rings so that the containers can be conveyed with the neck rings sliding in a friction engagement along the third pair of flanges as the containers are conveyed through the third air conveyor section, the third air conveyor section being coupled with the second air conveyor section in a manner so that the third conveying slot is adapted to receive the containers from the second air conveyor section for continued conveyance of the containers in the downstream direction, the third pair of flanges having an upstream end and a downstream end, the upstream end of the third pair of flanges being proximate the downstream end of the second pair of flanges, the upstream end of the third pair of flanges lying in the first generally horizontal plane, the downstream end of the third pairs of flanges lying in the second generally horizontal plane.

11. The conveyor apparatus of claim 10 where each of the first, second, and third pairs of flanges incline slightly as they extend in the downstream direction so that the first, second, and third pairs of flanges are in a down-stepping relationship as the apparatus extends in the downstream direction.

12. A conveyor apparatus for conveying bottle containers having a neck ring with an outer diameter dimension, the conveyor apparatus comprising a plurality of air conveyor sections connected to one another in a series that extends generally in a downstream direction, each air conveyor section of said plurality of conveyor sections having a conveying slot extending longitudinally therethrough in the downstream direction, each conveying slot being defined by a pair of mutually opposed, laterally spaced, substantially horizontal flanges, the flanges of each section being laterally spaced by a distance smaller than the outer diameter dimension of the container neck rings so that the containers can be conveyed with the neck rings sliding in a friction engagement along the flanges as the containers are conveyed through each air conveyor section, said plurality of air conveyor sections being coupled with one another in a manner so that the conveying slot of each section is adapted to receive the containers from the air conveyor section immediately upstream thereof for continued conveyance of the containers in the downstream direction, the flanges of each air conveyor section inclining upwardly as they extend in the downstream direction so that the flanges of each section are in a down-stepping relationship relative to one other as the apparatus extends in the downstream direction.

13. The conveyor apparatus of claim 12 wherein the flanges of each conveying slot each have an upstream end and a downstream end, the plurality of air conveyor sections being coupled with one another in a manner so that the downstream end of each pair of flanges is slightly higher than the upstream end of the flanges of the air conveyor section that is positioned immediately downstream thereof.

14. The conveyor apparatus of claim 12 wherein the flanges of each conveying slot each have an upstream end and a downstream end, the upstream ends of all of the flanges lying in a first generally horizontal plane, the downstream ends of all of the flanges lying in a second generally horizontal plane, the second plane being spaced slightly above the first plane.

* * * * *